UNITED STATES PATENT OFFICE.

FRANK E. CHADWICK, OF ROCHESTER, NEW YORK, ASSIGNOR TO THE F. E. C. MEDICINE COMPANY, OF SAME PLACE.

REMEDY FOR KIDNEY DISEASES.

SPECIFICATION forming part of Letters Patent No. 350,867, dated October 12, 1886.

Application filed April 22, 1886. Serial No. 199,786. (No specimens.)

*To all whom it may concern:*

Be it known that I, FRANK E. CHADWICK, of Rochester, in the county of Monroe and State of New York, have invented a certain new and useful Compound for the Treatment of Kidney Diseases; and I do hereby declare the following to be a full, clear, and exact description of the invention, such as will enable others skilled in the art to which it pertains to make and use the same.

My invention relates to a new remedy for kidney diseases; and it consists of the following ingredients, viz: motherwort, barberry-leaf, couch-grass, winter-green, water, and gin, compounded and prepared in the proportions and manner hereinafter fully described and claimed.

In the preparation of my compound I first mix thoroughly, motherwort, (*Leonurus cardiaca,*) two parts; barberry-leaf, (*Berberis vulgaris,*) one part; couch-grass, (*Triticum repens,*) one part, and a quantity of winter-green sufficient to flavor the mixture. Then to every two pounds of said mixture I add four gallons of water. It is then boiled for thirty minutes, and, after boiling, is strained and filtered. To the result thus obtained I add twenty per cent. of gin. Instead of boiling, the same may be percolated with cold water.

In using my remedy the following directions should be adhered to:

For kidney trouble: In cases of long standing a table-spoonful should be taken four times a day, before meals and before retiring. In milder cases, take three times a day, before eating. For children, a tea-spoonful three times a day, before meals.

For female weakness: Dose, a dessert-spoonful three times a day, taken one hour after meals.

General directions: While using this remedy all alcoholic drinks and excesses of every description should be carefully avoided. The use of strong coffee should be strictly abstained from.

I am aware that the motherwort and couch-grass are separately in common use as diuretics in the form of infusions.

Having fully described my invention, what I claim, and desire to secure by Letters Patent, is—

The herein-described remedy for kidney diseases, consisting of motherwort, barberry-leaf, couch-grass, winter-green, water, and gin, prepared in the proportions and manner specified.

In testimony whereof I have signed this specification in the presence of two subscribing witnesses.

FRANK E. CHADWICK.

Witnesses:
GEO. H. HUMPHREY,
JAMES MURPHY.